Feb. 12, 1946.   H. G. ORSER ET AL   2,394,934
PROCESS OF PRODUCING OPHTHALMIC LENSES
Filed April 25, 1942    3 Sheets-Sheet 1

Inventors
HORACE G. ORSER.
JOSEPH P. CROWLEY.
By Frank Fraser
Attorney

Feb. 12, 1946.  H. G. ORSER ET AL  2,394,934
PROCESS OF PRODUCING OPHTHALMIC LENSES
Filed April 25, 1942   3 Sheets-Sheet 2

Inventors
HORACE G. ORSER.
JOSEPH P. CROWLEY.

By Frank Fraser
Attorney

Inventors
HORACE G. ORSER,
JOSEPH P. CROWLEY
By Frank Fraser
Attorney

Patented Feb. 12, 1946

2,394,934

UNITED STATES PATENT OFFICE 2,394,934

PROCESS OF PRODUCING OPHTHALMIC LENSES

Horace G. Orser, Perrysburg, and Joseph P. Crowley, Toledo, Ohio, assignors to Libbey-Owens-Ford Glass Company, Toledo, Ohio, a corporation of Ohio Application April 25, 1942, Serial No. 440,552

8 Claims. (Cl. 88—54)

The present invention relates to an improved process of forming ophthalmic lenses of the concavo-convex type.

Although the lenses of this invention are not limited to any particular use, they are of especial utility for use in aviators' goggles. There exists, at the present time, a considerable demand for aviators' goggle lenses having no refractive power and which will therefore afford normal vision. This invention deals with the making of a lens of this character.

More particularly, the invention contemplates a process of forming a cylindrical lens of zero power, the opposite surfaces of which do not have concentric centers. That is to say, the opposite surfaces of the lens are curved on different radii whose centers are not the same and which results in a concavo-convex lens substantially wedge-shaped in horizontal cross section.

Heretofore, it has been the general practice to produce lenses of this type by first grinding one surface of a glass blank and then the opposite surface thereof with cylindrical grinding machines of a character well known in the optical art. Such a procedure is, however, relatively slow and expensive and incapable of satisfying the present wartime demands for mass production.

Generally stated, it is the aim of this invention to provide an improved process of producing a lens of the above type more rapidly and economically than heretofore possible by resorting mainly to the bending or shaping of the glass and which requires a minimum amount of grinding.

Briefly, in carrying out the invention, a flat sheet of glass having opposite parallel surfaces is first subjected to an initial or prebending operation to produce a cylindrical lens blank having a slightly negative power. The concave surface of the lens blank is then ground flat to give a positive power, after which the blank is subjected to a final bending which gives zero power. A plurality of lenses are preferably formed in a single blank and then subsequently cut therefrom after the final bending operation.

Other objects and advantages of the invention will become more apparent during the following description when taken in connection with the accompanying drawings, wherein are illustrated the type of lens produced by the invention and the several steps followed in the process of making the same, and in which.

Figure 1:
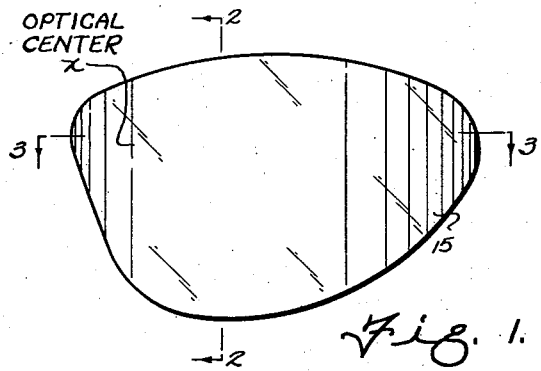
Fig. 1 is a front or plan view of a form of lens produced by the process of this invention.
Figure 2:
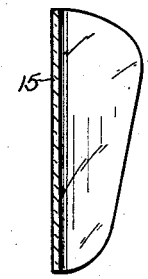
Fig. 2 is a vertical section taken substantially on line 2—2 of Fig. 1.
Figure 3:
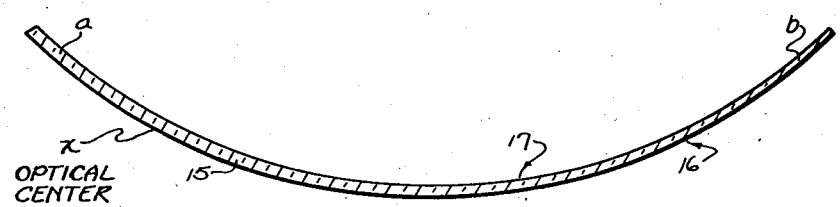
Fig. 3 is a horizontal section taken substantially on line 3—3 of Fig. 1.

With reference now to the drawings and particularly to Figs. 1, 2 and 3, there is illustrated a lens 15 produced by the process of the present invention. The form of lens represented is an aviator's goggle lens and is of the concavo-convex type. More particularly, the lens 15 is provided with opposite convex and concave surfaces 16 and 17 which diverge from the thicker end $a$ to the optical center $x$ and then converge to the thinner end $b$ to form a lens which is substantially wedge-shaped in horizontal cross section. The thickness of the lens does not vary in vertical cross section as shown in Fig. 2. The thicker end $a$ of the lens is the nasal end and the thinner end $b$ the temporal end. The convex and concave surfaces 16 and 17 of the lens are cylindrical, although they do not have concentric centers. That is to say, the opposite surfaces of the lens are bent on different radii whose centers are not the same and which results in the lens being substantially wedge-shaped in horizontal cross section and having zero power. In other words, the lens has no refractive power so that it affords normal vision and does not tend to either magnify or diminish objects viewed therethrough.

Figure 4:
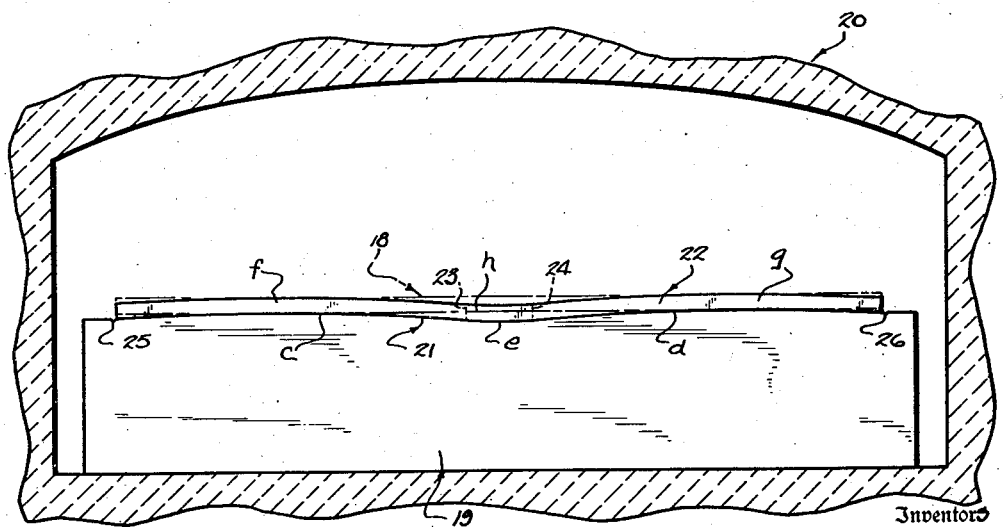
Fig. 4 is a view showing the prebending of the glass sheet.
Figure 5:
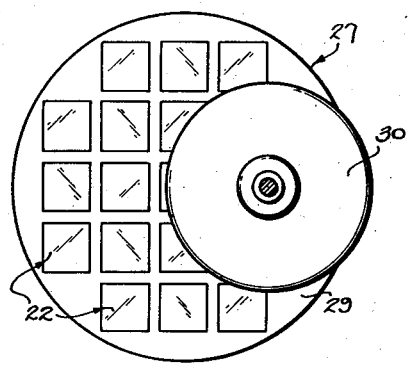
Figs. 5 and 6 are diagrammatic plan views showing respectively one type of grinding machine and polishing machine which may be employed for grinding and polishing the glass sheet after prebending.
Figure 6:
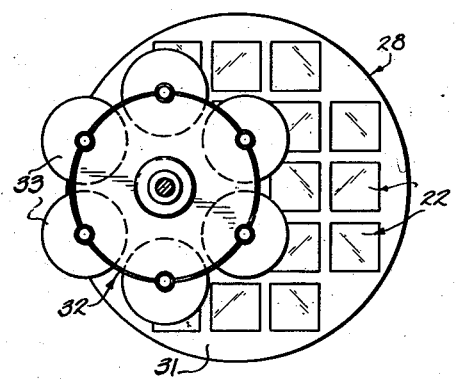
Figure 7:
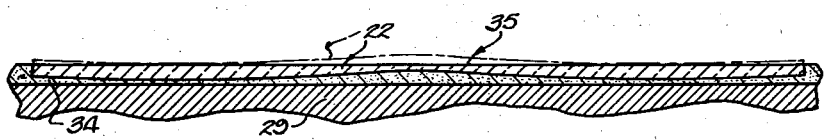
Fig. 7 is a detail sectional view showing one method of mounting the prebent glass sheet upon the grinding and polishing tables.
Figure 8:
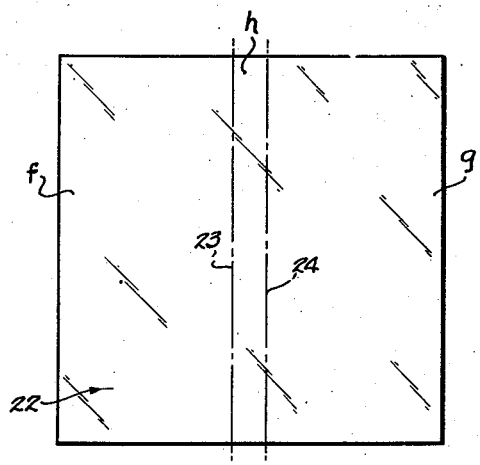
Fig. 8 illustrates the manner in which the ground and polished glass sheet is cut to provide two separate lens blanks.

In Figs. 4 to 13 are illustrated the several steps which are followed in the process of producing the lens 15. In carrying out the invention, a flat sheet of glass of the desired dimensions and having opposite parallel surfaces is first subjected to an initial or prebending operation to give a cylindrical lens blank having a slightly negative power. Thus, as illustrated in Fig. 4, a flat sheet of glass 18 having opposite parallel surfaces is laid horizontally upon the top of a mold 19 within a suitable bending furnace 20. The mold 19 may be formed of any preferred material, and the upper surface 21 thereof is shaped to give the desired curvature to the glass sheet 18. More particularly, the upper surface 21 of the mold is shaped to provide the two slightly cylindrical convex surface portions $c$ and $d$ which curve gradually inwardly and downwardly to a central low point $e$.

The flat sheet of glass 18 is placed upon the mold 19 and heated within the furnace 20 to a temperature sufficient to cause the glass to sink or settle downwardly by its own weight and take the shape of the upper surface 21 of the mold as indicated at 22. When this is done, the glass sheet 22 is shaped to provide the two lens blanks $f$ and $g$ which are connected together by a narrow central strip $h$. Each lens blank $f$ and $g$ is cylindrical and has opposite parallel surfaces which give a slightly negative power. The lens blanks are adapted to be separated from one another before final bending by cutting the glass sheet along the lines indicated at 23 and 24 and the narrow central strip $h$ discarded. As will be more fully hereinafter described, a plurality of lenses 15 are adapted to be cut from each of the lens blanks $f$ and $g$.

For the purpose of facilitating the proper positioning of the glass sheet 18 upon the mold 19, the upper surface 21 of said mold is preferably provided adjacent its opposite side edges with score lines 25 and 26 or other suitable markings to permit the accurate positioning of the glass sheet upon the mold.

After the glass sheet has been prebent, the concave surfaces of the lens blanks $f$ and $g$ or, in other words, the surfaces thereof in contact with the mold 19, are ground flat and then polished. This can be accomplished in any desired manner and upon any suitable type grinding and polishing machines, such as, for example, those shown diagrammatically in Figs. 5 and 6 and indicated generally by the numerals 27 and 28 respectively. The grinding machine 27 comprises a rotatable table 29, above which is mounted a rotatable grinding runner 30, while the polishing machine 28 also comprises a rotatable table 31 and a polishing runner 32 carrying a plurality of freely rotatable polishing blocks 33.

In grinding the lens blanks $f$ and $g$, the prebent glass sheet 22 is suitably secured upon the top of the grinding table 29, such as by bedding the same in a layer of plaster of Paris or the like 34. The position of the glass sheet 22 when initially secured upon the grinding table is indicated in broken lines in Fig. 7 and is shown in full lines after the concave surface portions thereof have been ground to produce a flat surface 35. After grinding, the upper flat surface 35 of the glass sheet is polished upon the polishing machine 28 to which it may also be secured by a layer of plaster of Paris or the like.

Figure 9:
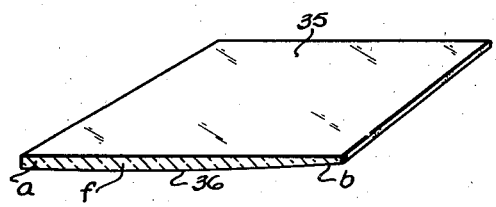
Fig. 9 is a perspective sectional view of one of the lens blanks.

When the concave surfaces of the lens blanks $f$ and $g$ are ground flat, the said blanks will have a positive power, whereas the finished lens is adapted to give zero power and thereby afford normal vision. This is accomplished during the final bending operation illustrated in Figs. 10, 11 and 12. Before final bending, however, the ground and polished glass sheet 22 is cut along the lines 23 and 24 to separate the two lens blanks $f$ and $g$, each of which is substantially rectangular and adapted to be independently bent. The central glass strip $h$ which is removed is discarded. As shown in Fig. 9, each lens blank is substantially wedge-shaped in cross section and has a flat ground and polished surface 35 and a slightly convex surface 36 which was formed by the prebending operation.

In the final bending operation, the lens blank is shaped within a concave mold 37 of any desired material and having its upper concave surface 38 shaped to conform to the final curvature to be given the lens blank. At the beginning of the bending operation, the mold 37 is preferably arranged at an angle of approximately 45°, as illustrated in Fig. 10, and the lens blank $f$ supported thereby at a corresponding angle.

To maintain the lens blank in such position, the upper concave surface 38 of the mold is provided along one side thereof with a longitudinally extending notch or shoulder 39 for receiving the adjacent side edge of the lens blank. It has been found that the arranging of the mold and lens blank at an angle as shown is of decided advantage in that it results in a more uniform heating and settling of the blank into the mold. It has also been found that best results can be obtained when the thicker end $a$ of the lens blank is supported upon the shoulder 39. When positioning the lens blank in the mold, the slightly convex surface 36 of the blank formed in prebending is the inner or bottom surface.

Figure 10:
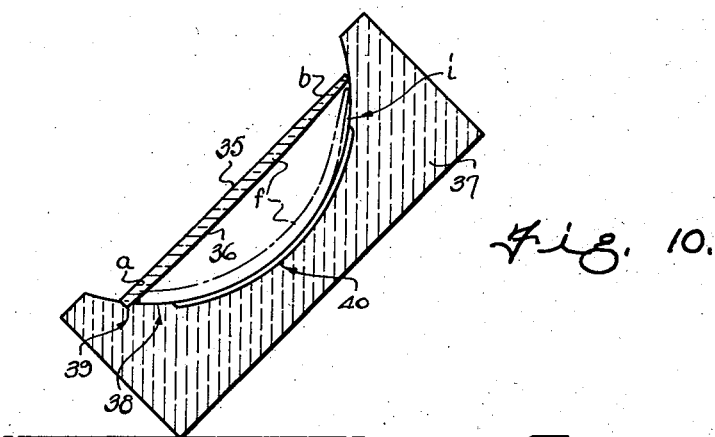
Fig. 10 is a transverse sectional view of the mold used for final bending of the lens blank and showing the manner of supporting the blank within said mold at the beginning of the bending operation.
Figure 11:
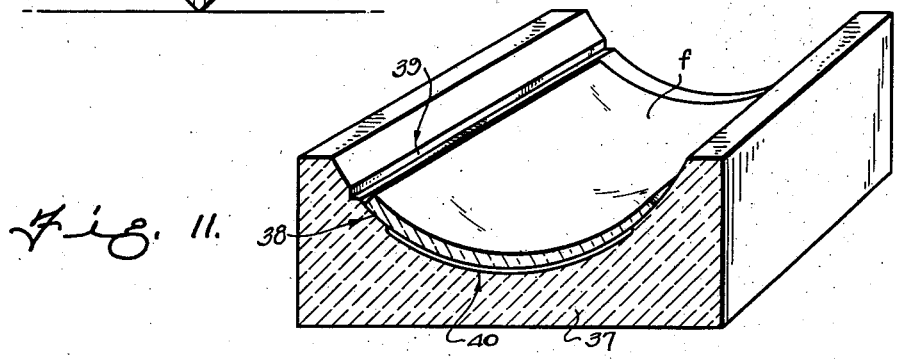
Fig. 11 is a perspective sectional view showing the mold in horizontal position at the completion of the bending operation.
Figure 12:
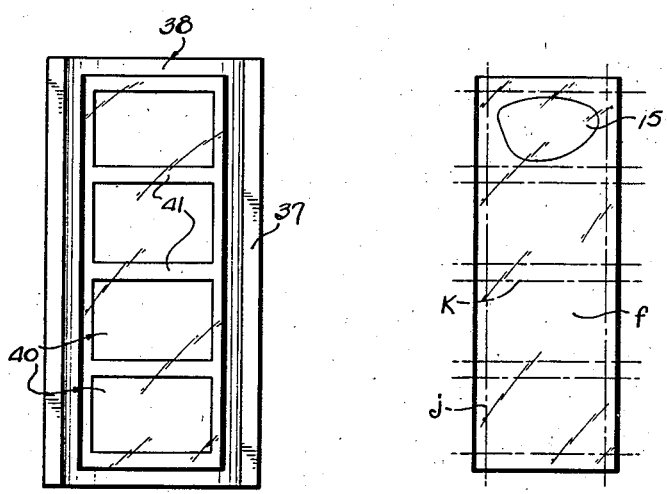
Fig. 12 is a plan view of the bending mold.
Figure 13:
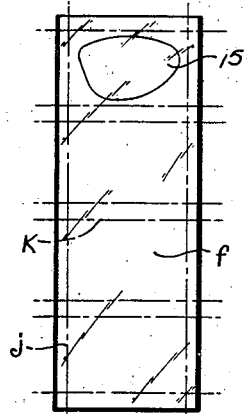
Fig. 13 is a plan view of the lens blank after final bending and showing the manner of cutting out a plurality of lenses therefrom.

The mold 37 and lens blank $f$ are then heated in a furnace to the desired temperature to cause the blank to settle or sink downwardly into the mold as indicated in broken lines in Fig. 10. At this time, the lens blank conforms substantially completely to the concave surface 38 of the mold with the exception of the thinner end portion $b$ thereof which is usually spaced slightly therefrom as indicated at $i$. When the lens blank has been bent to this extent, the mold is lowered into horizontal position as shown in Fig. 11 and heating continued until the thinner portion of the lens blank also conforms to the mold surface.

After final bending, the opposite surfaces of the lens blank are cylindrical but are not parallel with one another. Thus, the opposite surfaces of the blank are bent on different radii whose centers are not the same. Stated differently, when the blank is prebent, it has two parallel cylindrical curved surfaces. Then, when the concave surface is ground, there is produced a blank having a convex curved surface and a flat surface. Therefore, when the blank is subjected to final bending to form the two surfaces into cylindrical form, they must of necessity have different radii and different centers of curvature.

As pointed out above, a plurality of lenses 15 are adapted to be cut from each lens blank $f$ and $g$. It is preferred that the mold 37 be of such construction that those portions of the lens blank from which the lenses are to be cut will not come into contact with the mold during bending, whereby marring or impairment of the glass surface by contact with the mold will be obviated. To this end, the concave shaping surface 38 of the mold 37 may be provided along the bottom thereof with a plurality of recessed or cut-out portions 40 of suitable depth and also of a size relatively larger than the lenses 15 to be cut from the blank; said recesses being separated from one another by transverse ribs 41.

By recessing or undercutting the bottom of the mold, it will be seen that those portions of the blank from which the lenses are to be cut will be maintained out of contact with the mold during bending so that danger of these portions being marred or otherwise impaired by contact with the mold surface will be prevented. Upon being bent, the lens blank will be supported entirely around its marginal portions and also intermediate its ends by the transverse ribs 41. As illustrated diagrammatically in Fig. 13, the marginally supported portions of the lens blank are indicated at $j$, while the portions supported by the transverse ribs are indicated at $k$. A plurality of lenses 15 are then cut from those portions of the lens blank which were unsupported and did not come in contact with the mold surface.

We claim:

1. The process of forming an ophthalmic lens of zero power, comprising prebending a flat sheet of glass having opposite parallel surfaces to provide a lens blank of slightly cylindrical form, grinding the concave surface of the lens blank flat, again bending the lens blank to final cylindrical form, with the previously ground flat surface thereof constituting the concave surface, and then cutting from said blank a lens substantially wedge-shaped in horizontal cross section and having its opposite surfaces bent on different radii whose centers are not the same.

2. The process of forming an ophthalmic lens of zero power, comprising prebending a flat sheet of glass having opposite parallel surfaces upon a convex mold to provide a lens blank of slightly cylindrical form, grinding the concave surface of the lens blank flat, again bending the lens blank to final cylindrical form upon a concave mold, with the previously ground flat surface thereof constituting the concave surface, and then cutting from said blank a lens substantially wedge-shaped in horizontal cross section and having its opposite surfaces bent on different radii whose centers are not the same.

3. The process of forming an ophthalmic lens of zero power, comprising prebending a flat sheet of glass having opposite parallel surfaces to provide a pair of lens blanks, each being of slightly cylindrical form, grinding the concave surfaces of the lens blanks flat, cutting the glass sheet to separate the lens blanks and independently bending each lens blank to final cylindrical form, with the previously ground flat surface thereof constituting the concave surface, and then cutting a plurality of lenses from said lens blank, each lens being substantially wedge-shaped in horizontal cross section and having its opposite surfaces bent on different radii whose centers are not the same.

4. The process of forming an ophthalmic lens of zero power, comprising prebending a flat sheet of glass having opposite parallel surfaces upon a convex mold to provide a pair of lens blanks, each being of slightly cylindrical form, grinding the concave surfaces of the lens blanks flat, cutting the glass sheet to separate the lens blanks and independently bending each lens blank to final cylindrical form upon a concave mold, with the previously ground flat surface thereof constituting the concave surface, and then cutting a plurality of lenses from said lens blank, each lens being substantially wedge-shaped in horizontal cross section and having its opposite surfaces bent on different radii whose centers are not the same.

5. The process of forming an ophthalmic lens of zero power, comprising prebending a flat sheet of glass having opposite parallel surfaces to provide a lens blank of slightly cylindrical form, grinding the concave surface of the lens blank flat, again bending the lens blank to final cylindrical form by supporting said blank at an angle to the vertical during the first stage of the bending operation and in a horizontal position during the final stage of said bending operation, and then cutting from said blank a lens substantially wedge-shaped in horizontal cross section and having its opposite surfaces bent on different radii whose centers are not the same.

6. The process of forming an ophthalmic lens of zero power, comprising prebending a flat sheet of glass having opposite parallel surfaces upon a convex mold to provide a lens blank of slightly cylindrical form, grinding the concave surface of the lens blank flat, again bending the lens blank to final cylindrical form upon a concave mold by supporting said blank at an angle to the vertical during the first stage of the bending operation and in a horizontal position during the final stage of said bending operation, and then cutting from said blank a lens substantially wedge-shaped in horizontal cross section and having its opposite surfaces bent on different radii whose centers are not the same.

7. The process of forming an ophthalmic lens of zero power, comprising prebending a flat sheet of glass having opposite parallel surfaces to provide a pair of lens blanks, each being of slightly cylindrical form, grinding the concave surfaces of the lens blanks flat, cutting the glass sheet to separate the lens blanks and independently bending each lens blank to final cylindrical form by supporting said blank at an angle to the vertical during the first stage of the bending operation and in a horizontal position during the final stage of said bending operation, and then cutting a plurality of lenses from each lens blank, each lens being substantially wedge-shaped in horizontal cross section and having its opposite surfaces bent on different radii whose centers are not the same.

8. The process of forming an ophthalmic lens of zero power, comprising prebending a flat sheet of glass having opposite parallel surfaces upon a convex mold to provide a pair of lens blanks, each being of slightly cylindrical form, grinding the concave surfaces of the lens blanks flat, cutting the glass sheet to separate the lens blanks and independently bending each lens blank to final cylindrical form upon a concave mold by supporting said blank at an angle to the vertical during the first stage of the bending operation and in a horizontal position during the final stage of said bending operation, and then cutting a plurality of lenses from each lens blank, each lens being substantially wedge-shaped in horizontal cross section and having its opposite surfaces bent on different radii whose centers are not the same.

HORACE G. ORSER.
JOSEPH P. CROWLEY.